United States Patent
Sakai et al.

(10) Patent No.: US 6,658,196 B2
(45) Date of Patent: Dec. 2, 2003

(54) EDITING TECHNIQUE MERGING VIDEO SIGNALS RECORDED ON THE SAME OPTICAL DISK

(75) Inventors: Seiichi Sakai, Tokyo (JP); Hideki Ando, Kanagawa (JP); Norihiko Noguchi, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/185,021

(22) Filed: Nov. 3, 1998

(65) Prior Publication Data

US 2003/0012550 A1 Jan. 16, 2003

(30) Foreign Application Priority Data

Nov. 5, 1997 (JP) .......................................... P9-302628

(51) Int. Cl.[7] ................................................ H04N 5/93
(52) U.S. Cl. ............................. 386/55; 386/52; 386/64
(58) Field of Search .............................. 386/55, 52, 64; 360/60, 13; 369/83; 345/723–726

(56) References Cited

U.S. PATENT DOCUMENTS

| | | | | |
|---|---|---|---|---|
| 4,974,111 A | * | 11/1990 | Platte et al. | 386/56 |
| 5,649,046 A | * | 7/1997 | Stewart et al. | 386/52 |
| 6,035,093 A | * | 3/2000 | Kazami et al. | 386/52 |
| 6,118,444 A | * | 9/2000 | Garmon et al. | 345/328 |
| 6,157,771 A | * | 12/2000 | Brewer et al. | 386/69 |
| RE37,342 E | * | 8/2001 | Washino et al. | 348/722 |
| 6,301,428 B1 | * | 10/2001 | Linzer | 386/52 |

* cited by examiner

Primary Examiner—Andrew Christensen
Assistant Examiner—Polin Chieu
(74) Attorney, Agent, or Firm—Frommer Lawrence & Haug LLP; William S. Frommer

(57) ABSTRACT

An editing apparatus for editing video signals recorded on an optical disk. The editing apparatus comprises: a video signal reproducing unit for reproducing a first and a second video signal from the optical disk; a video signal merging unit for merging the first and the second video signal to generate a combined video signal for a transition from the first video signal to the second video signal in accordance with a predetermined transition period and a predetermined transition mode; and a video signal recording unit for recording the combined video signal to the optical disk. The combined video signal is recorded to the optical disk only with respect to the transition period.

10 Claims, 4 Drawing Sheets

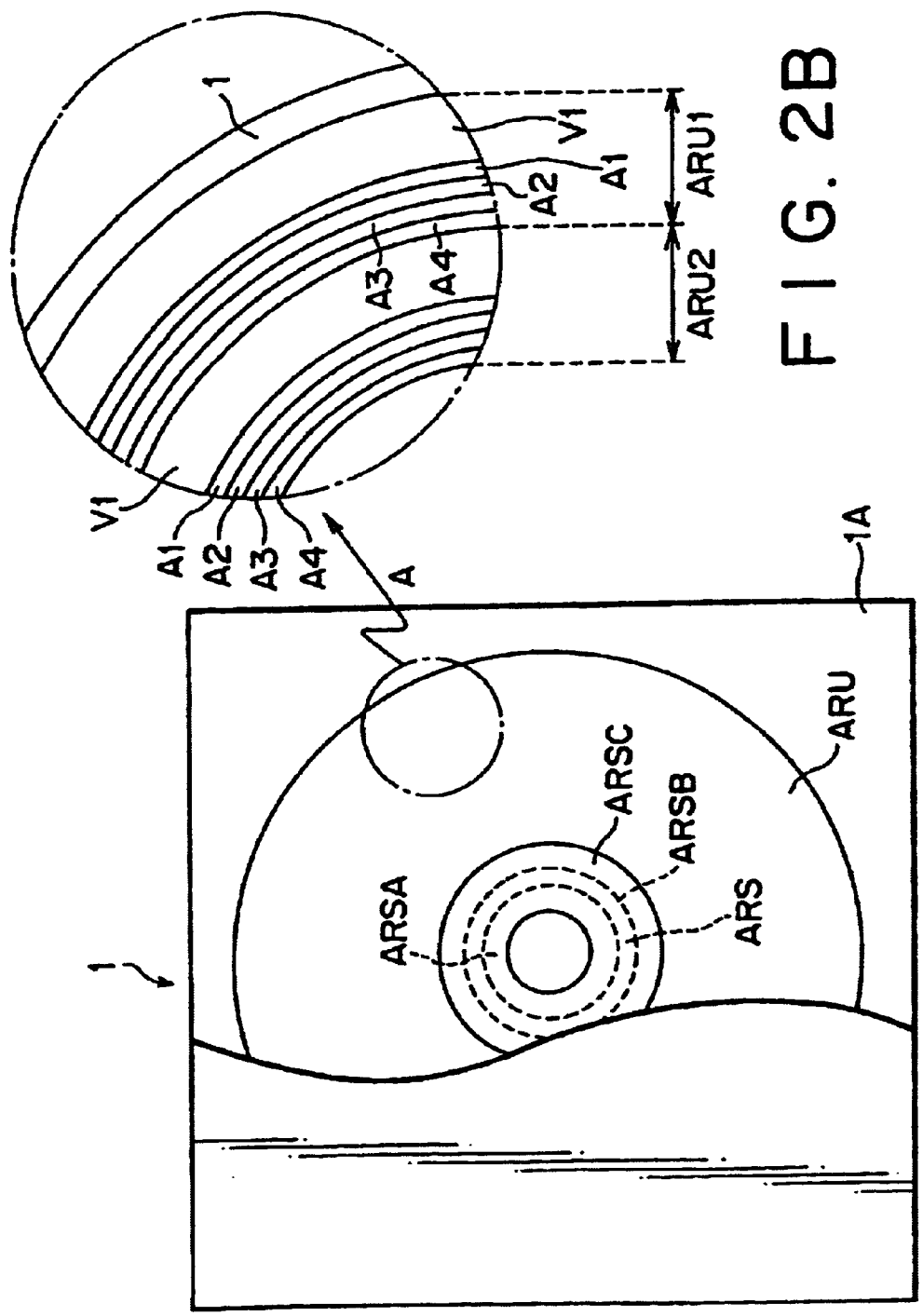

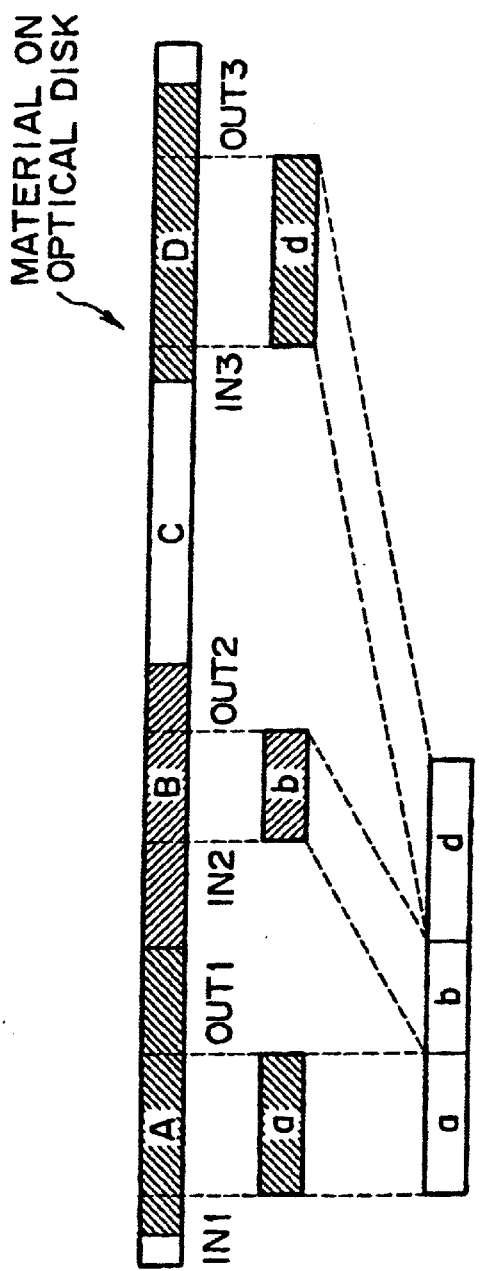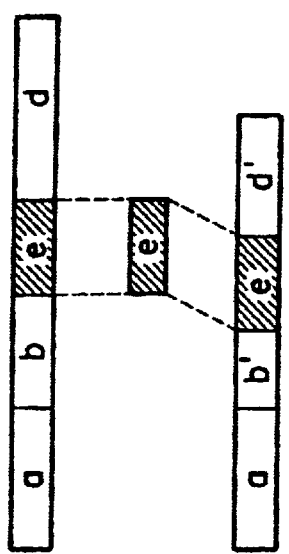
F I G. 3A
F I G. 3B
F I G. 3C
F I G. 3D
F I G. 3E
F I G. 3F

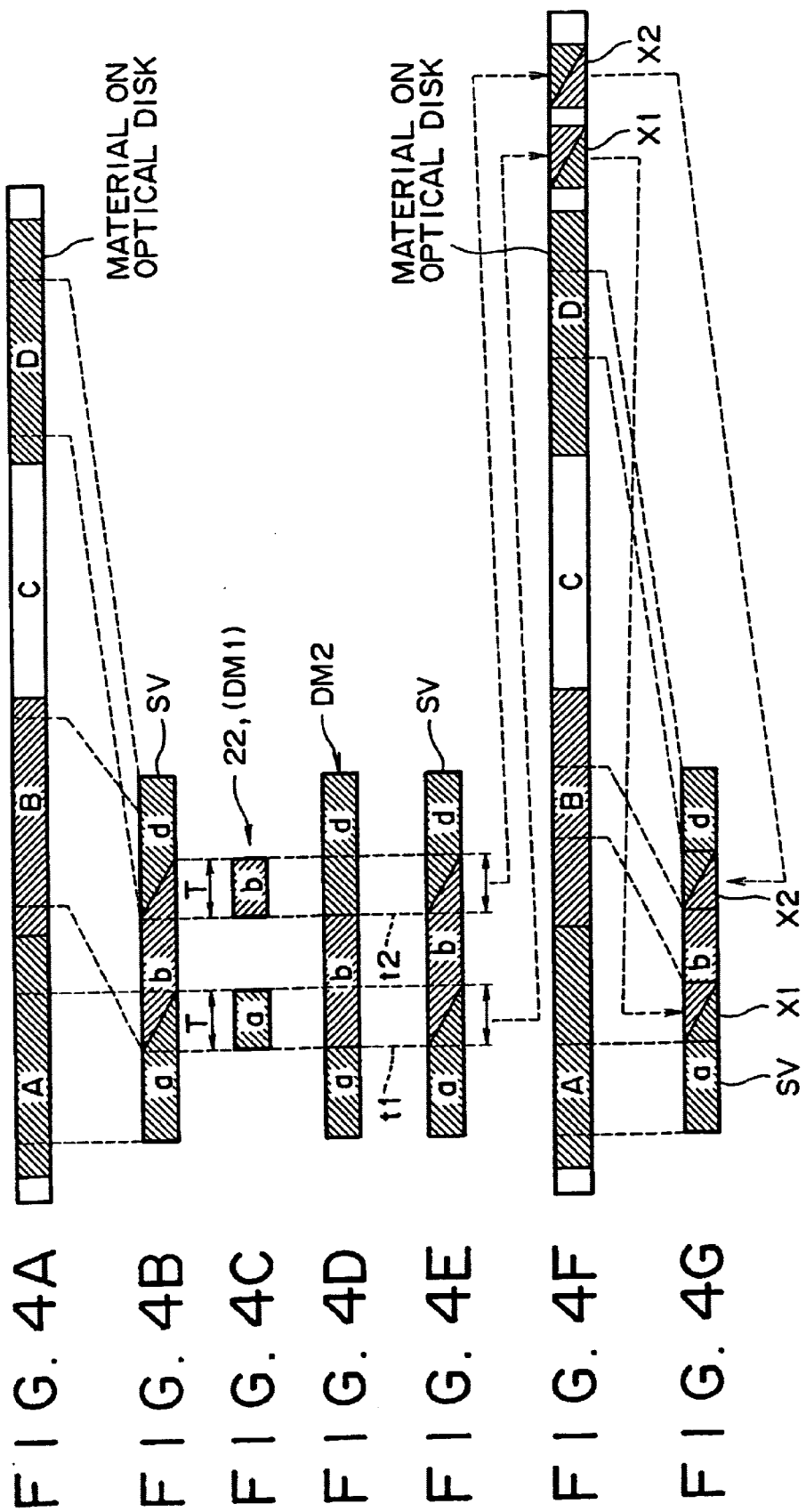

EDITING TECHNIQUE MERGING VIDEO SIGNALS RECORDED ON THE SAME OPTICAL DISK

BACKGROUND OF THE INVENTION

1. Field of the Invention

The present invention relates to an editing apparatus and an editing method adapted illustratively to an editing system for editing contents stored on phase change type optical disks. More particularly, the invention relates to an editing apparatus and an editing method constituting a simply structured time-saving editing setup whereby two video signals are merged into a combined video signal only for transition periods required of the merged before the combined video signal is written to an optical disk.

2. Description of the Related Art

Conventionally, video and audio signals are merged and afforded special effects as needed when edited. Such special effects are carried out primarily by one of two techniques. By one technique, two video signals are merged so that cuts from the first and the second video signal will be combined, as in the case of what is known as "wipe." By another technique, "fade-in" and "fade-out" are combined so that cuts from the first and the second video signal will be merged.

The merging of two target video signals proceeds conventionally as follows: two video tape recorders are used to reproduce the two video signals. During the reproduction, the two video signals are merged in keeping with the mode of transitions such as wipe. The resulting video signal thus combined is recorded by a third video tape recorder.

If there is available a video tape recorder having a pre-read head, cuts to be merged are recorded in advance on a magnetic tape. That tape is set on the pre-read head-equipped video tape recorder and played back. The video signal reproduced by the pre-read head is merged with a video signal from another video tape recorder. The resulting signal thus combined is recorded by the latter video tape recorder using its post-write head.

Whenever two video signals are merged conventionally for special effects during a video signal editing process, at least two video tape recorders are needed, one being equipped with the pre-read head. Such a conventional editing setup tends to leave the whole system configuration complicated.

In any case, the video signal reproduced by one video tape recorder must be recorded again by another video tape recorder. This means that completing a desired program takes as long as the real time required to run the entire program (i.e., complete package). Thus the editing procedure can be a time-consuming process.

Where a plurality of cuts are merged on a time series basis in conjunction with special effects (i.e., so-called multi-effect editing), it is difficult to preview the whole program; the individual cuts must be combined with the corresponding special effects and verified. In such a case, it takes more time than ever to perform the necessary editing.

It is therefore an object of the present invention to overcome the above and other deficiencies and disadvantages of the conventional art and to provide an editing apparatus and an editing method constituting a simply structured time-saving editing environment.

SUMMARY OF THE INVENTION

In carrying out the invention and according to one aspect thereof, there are provided an editing apparatus and an editing method whereby a first and a second video signal reproduced from an optical disk are merged to generate a combined video signal for a transition from the first video signal to the second video signal in accordance with a predetermined transition period and a predetermined transition mode, the combined video signal being recorded to the optical disk only with respect to the transition period.

The invention is characterized in that the combined video signal for a transition from the first to the second video signal is generated in accordance with a predetermined transition period and a predetermined transition mode, and that the combined video signal is recorded to the optical disk only with respect to the transition period. Under that scheme, the first video signal, the combined video signal and the second video signal are reproduced successively from the optical disk for editing work where the combined video signal corresponding to the transition period has been simply recorded on the optical disk. That is, video signals are edited by a simplified setup comprising video signal reproducing means for reproducing the first video signal, the second video signal and the combined video signal; video signal merging means for merging video signals; and video signal recording means for recording the combined video signal to the optical disk. Editing of video signals takes only as long as the time required to record the combined video signal to the optical disk.

Other objects, features and advantages of the invention will become more apparent upon a reading of the following description and appended drawings.

BRIEF DESCRIPTION OF THE DRAWINGS

FIG. 2 is a plan view of an optical disk used by the optical disk apparatus of FIG. 1;

FIGS. 3A through 3F are timing charts provided to explain the editing of cuts by the optical disk apparatus of FIG. 1; and FIGS. 4A through 4G are timing charts provided to explain the editing of special effects by the optical disk apparatus of FIG. 1.

DESCRIPTION OF THE PREFERRED EMBODIMENTS

Figure 1:
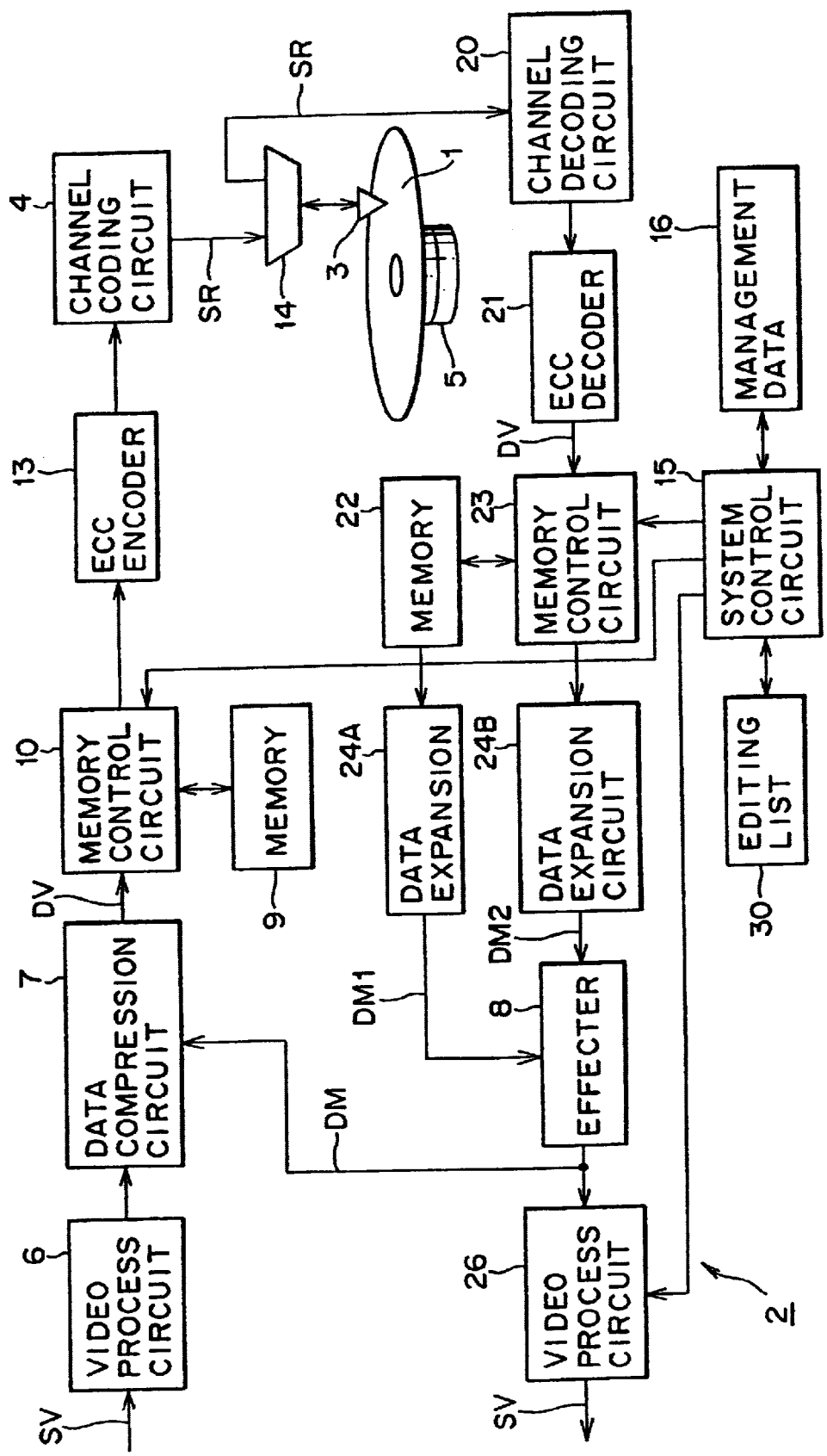
FIG. 1 is a block diagram of an optical disk apparatus embodying the invention.

Preferred embodiments of this invention will now be described with reference to the accompanying drawings.

(1) First Embodiment (1-1) Constitution of the First Embodiment

FIG. 2 is a plan view of an optical disk 1 for use by an editing system practiced as a first embodiment of this invention. The optical disk 1 is housed in a suitable cartridge 1A for protection against the intrusion of dust and other foreign matters. When the cartridge 1A containing the optical disk 1 is loaded into a television camera, an optical disk apparatus or the like, a shutter of the cartridge 1A is slid open to expose a data-recorded surface of the disk. The exposed disk surface is accessed by the device in which the disk is loaded.

The optical disk 1 is a writable photo-crystallization type optical disk having data recorded on both sides. On the disk surface, a pre-groove bearing a guide groove to guide a laser beam is formed in a wobbling fashion. The optical disk is rotated at a zone-constant linear velocity (ZCLV) so that the pre-groove will wobble at constant intervals under the laser beam spot.

On the inner side of the optical disk 1 is a system data area ARS that is divided into three concentric areas: ARSA, ARSB and ARSC. The innermost area ARSA has management data recorded when the optical disk was produced. The management data in this area include an optimum intensity of light in effect upon recording of data to the optical disk 1 in question, a serial number common to a batch of optical disks 1, and identification data specific to each optical disk 1.

The next inner area ARSB accommodates management data about video and audio signals recorded on the optical disk 1. The management data in this area comprise data needed to access each video and audio signal, data required for decoding, image pickup condition data, and identification data set by a camera operator to designate whether or not files identified thereby are allowed to be edited.

The data needed for the signal access include address information and time codes. The address information denotes start and end locations for the recording of video and audio signals in various files, and the time codes represent points in time at which to start and end such recording. The data required for decoding comprise formats of the video and audio signals, audio signal sampling rates, and data for identifying compression and non-compression. The image pickup condition data are constituted by the date, time of day, and location of the recording; the cameraman's name; and setting data of the television camera. The setting data are made up of a white balance, gain, audio signal levels, and lens aperture data set for the television camera. The management data stored in the area ARSB permit verification of histories of the files recorded on the optical disk 1.

The next inner area ARSC store editing data. The editing data are recorded in a file format including editing lists by which to edit various files recorded on the optical disk 1. The editing lists include edit point data set for the files, the data being defined by time codes and addresses and recorded in the order of eventual data reproduction with a transition mode and a transition period. The editing data allow a desired editing list to be selected so that recorded contents are reproduced successively from the optical disk 1 in accordance with the editing list.

The peripheral area ARU is allocated as a user area that has digital video and audio signals recorded therein. The user area ARU is divided concentrically into ARU1, ARU2, etc. Each divided area ARU1, ARU2, etc., is further divided concentrically into five smaller areas. The outermost of the five areas is allocated as an area to record a digital video signal V1; the remaining four areas are used to accommodate four-channel digital audio signals A1 through A4. Structured in this manner, the optical disk 1 may illustratively record a digital video signal in conjunction with various audio sources: the voices of objects being picked up and noise of the surroundings (called the ambient sound hereunder), narratives by an announcer, explanations in a number of languages, and background music.

FIG. 1 is a block diagram of an optical disk apparatus 2 applicable to the inventive editing system. The optical disk apparatus 2 is used to edit video and audio signals recorded on the optical disk 1. The signals may have been recorded to the disk either by television camera or by the optical disk apparatus 2.

An optical pickup 3 of the optical disk apparatus 2 is moved radially over the optical disk 1 by a sled mechanism, not shown, for access to desired disk areas. The optical pickup 3 emits a laser beam to the optical disk 1 and, having obtained the reflected light, performs tracking and focus control accordingly. In addition, the optical pickup 3 generates and outputs a reproduced signal whose level varies depending on the intensity of the reflected light from the disk surface.

The optical pickup 3 further outputs a laser beam intensity monitoring signal whose level varies with the intensity of the laser beam. Under control of a servo circuit referencing the signal level of the monitoring signal, a channel coding circuit 4 outputs a driving signal SR or the like. Given such a driving signal, the optical pickup 3 raises the intensity of the laser beam intermittently from a reproducing level to an optimal pit forming level. This allows the optical disk apparatus 2 thermally to record desired data onto the optical disk 1.

During the recording of data, the optical pickup 3 seeks cyclically the divided areas in the user area ARU. In each divided user area, the optical pickup 3 moves from the outer to the inner component areas to thermally record digital video and audio signals onto the optical disk 1. The optical disk apparatus 2 thus records digital video and audio signals successively from the outer to the inner areas on the optical disk 1, the outermost disk area permitting data to be reproduced at a high transfer speed when the optical disk 1 is rotated at ZCLV.

During the reproduction of video and audio signals from the optical disk 1, the optical pickup 3 under control of a system control circuit 15 seeks cyclically the divided areas of the user area ARU in the same manner as during the recording. At the time of a preview using special effects for merging two video signals, the optical pickup 3 gains access beforehand to an area where one of the two target video signals is recorded before accessing an area where the other video signal is recorded.

A spindle motor 5 rotates during recording the optical disk 1 at ZCLV under control of a servo circuit, not shown. During reproduction, the spindle motor 5 rotates the optical disk 1 at a constant angular velocity that is higher than the maximum rotating speed for recording. This allows the optical disk apparatus 2 to reproduce video and audio signals continuously by intermittently processing the reproduced signal obtained at the high transfer speed. The optical disk apparatus 2 causes the optical pickup 3 to perform seek operations by taking advantage of latency times stemming from the intermittent processing.

A video process circuit 6 receives a digital video signal SV and corrects its signal level. Furthermore, the video process circuit 6 removes unnecessary data components such as blanking intervals before outputting the video signal.

Given the digital video signal from the video process circuit 6, a data compression circuit 7 successively compresses the received data in an MPEG (Moving Picture Experts Group) format so as to output coded data DV. At this point, the data compression circuit 7 compresses the digital video signal in such a manner that the coded data DV will illustratively be in units of so-called GOPs (Groups of Pictures), each data unit comprising a constant quantity of data. Upon recording of a video signal involving special effects, the data compression circuit 7 likewise processes not the digital video signal from the video process circuit 6 but a digital video signal from an effecter 8 for subsequent data output.

A memory 9 is a mass buffer memory which, under control of a memory control circuit 10, temporarily accommodates the coded data DV from the data compression circuit 7 as well as audio data from an audio data process circuit, not shown. In addition, the memory 9 divides at predetermined time intervals the accommodated coded data DV and audio data into blocks. The coded data DV and audio data are multiplexed and output in units of such blocks on a time division basis. The time intervals are each set to correspond with a period represented by a multiple of GOPs of the coded data DV. During the process, the memory 9 successively multiplexes the coded data DV and audio data on a time division basis with sufficient intervals interposed to allow for seek operations of the optical pickup 3.

An ECC encoder 13 adds error correction codes and time codes to the time-division multiplexed data before interleaving and outputting the resulting data. During the process, the ECC encoder 13 sets each GOP of coded data DV and a data quantity denoting one GOP of audio data for one ECC data block, i.e., the unit of error correction. Each ECC data block is supplemented with an error correction code in a product code format.

The channel coding circuit 4 modulates the data from the ECC encoder 13 in accordance with a modulation scheme suitable for recording onto the optical disk 1. The channel coding circuit 4 further converts the modulated data into serial data to generate driving signals SR. The driving signals SR are output to the optical pickup 3 through a selection circuit 14. The optical disk apparatus 2 outputs alternately a driving signal SR derived from the coded data DV and a driving signal SR from the audio data with suitable time intervals interposed therebetween. In keeping with the output of the driving signals SR, the optical pickup 3 is driven to seek alternately the corresponding areas on the optical disk 1. This causes the video signal SV and audio signal to be written successively to the optical disk 1 in the format shown in FIG. 2.

In the inventive editing system, as described, its recording section for recording video and audio signals stops processing audio signals when recording a video signal involving special effects. Instead, only the coded data from the data compression circuit 7 are written to the area designated by a system control circuit 15.

In the reproduction section of the inventive editing system, the selection circuit 14 is used to input a reproduced signal RF from the optical pickup 3 to a reproduced signal process circuit, not shown. The reproduced signal process circuit reproduces a clock signal from the reproduced signal RF and, on the basis of that clock signal, subjects the reproduced signal RF to an analog-digital conversion process to generate a digital reproduced signal. The reproduction section further processes the digital reproduced signal using the PRML (Partial Response Maximum Likelihood) technique, generating reproduced data corresponding to the driving signals SR from the channel coding circuit 4. During the reproduction, the optical disk 1 is rotated at a rotating speed higher than the maximum recording speed. In the reproduction section, the optical pickup 3 outputs a reproduced signal RF of a high transfer speed corresponding to the rotating speed of the optical disk 1. This provides reproduced data at the high transfer speed corresponding to the reproduced signal RF.

A channel decoding circuit 20 decodes from the reproduced data the data output by the ECC encoder 13 and outputs the decoded data. An ECC decoder 21 corrects errors in the data from the channel decoding circuit 20 and subjects the corrected data to a de-interleaving process before outputting the data. When the optical pickup 3 of the first embodiment performs seek operations successively at predetermined time intervals, the ECC decoder 21 corrects errors in ECC data blocks derived from the coded data DV and from the audio data, alternately in units of a predetermined number of blocks, in keeping with the access operation of the optical pickup 3. The data output is effected at a high transfer speed corresponding to the rotating speed of the optical disk 1.

A memory 22 is a mass buffer memory which, under control of a memory control circuit 23, temporarily accepts the coded data DV and audio data from the ECC decoder 21 for temporary storage. In addition, the memory 22 expands on a time base the accommodated coded data DV and audio data and outputs the respective data on a consecutive time series basis. At the time of a preview using special effects or upon recording of the video signals involving special effects, the memory 22 outputs to a data expansion circuit 24A the coded data denoting the first video signal obtained through advance access of the optical pickup 3, and outputs to a data expansion circuit 24B the coded data representing the second video signal.

For ordinary reproduction, the data expansion circuit 24B expands the coded data input through the memory control circuit 23 and outputs the expanded video data. On the other hand, at the time of a preview using special effects or upon recording of the video signals involving special effects, the data expansion circuit 24B receives via the memory control circuit 23 the coded data denoting the second video signal from the memory 22, expands the received decoded data, and outputs the expanded video data.

At the time of a preview using special effects or upon recording of the video signals involving special effects, the data expansion circuit 24A is activated to expand the coded data denoting the first video signal from the memory 22 and to output the expanded video data.

For ordinary reproduction, the effecter 8 outputs unmodified the video data from the data expansion circuit 24B. At the time of a preview using special effects or upon recording of the video signals involving special effects, the effecter 8 assigns weights as per weighting factors to the video data from the data expansion circuits 24A and 24B for video data output under control of the system control circuit 15 in accordance with the transition mode of the special effects involved.

Specifically, when the transition mode is "wipe," the effecter 8 switches weighting factors so that the first video data from the data expansion circuit 24A will be replaced by the second video data from the data expansion circuit 24B at suitably timed horizontal synchronizing intervals. The switching of the weighting factors is timed so that the timings of the video data switchover will change gradually.

Upon recording of the video signals involving special effects, the effecter 8 of the first embodiment outputs the processed video data to the data compression circuit 7. From the data compression circuit 7, the processed data are recorded to appropriate areas on the optical disk 1.

A video process circuit 26 corrects the signal level of the video data from the effecter 8 and supplements the level-corrected data with blanking intervals and other data components before the output. In this manner, the video process circuit 26 outputs the video signal SV reproduced from the optical disk 1. At the time of a preview using special effects or upon recording of the video signals involving special effects, the video process circuit 26 outputs the processed results.

For special effects involving signal level changes in a single video signal such as fade-in and fade-out, the correction level of the video data is varied under control of the system control circuit 15. The video signal SV provided with the necessary special effect is then output.

An audio data reproduction section, not shown, converts the audio data from the memory control circuit 23 into an analog signal for output. This allows the optical disk apparatus 2 to monitor the contents of the optical disk 1 and to output the stored data as needed.

The system control circuit 15 is constituted by a microcomputer that controls the optical disk apparatus 2 in operation. When the optical disk 1 is loaded or when power is applied, the system control circuit 15 controls servo circuits to make the optical pickup 3 seek the inner side of the optical disk 1. The seek operation causes management data 16 to be acquired from the system data area ARS on the optical disk 1.

In response to the operator's action or under control of an externally attached computer or the like, the system control circuit 15 controls the above-described recording section to record the successively input video signal SV and audio signal onto the optical disk 1. During the process, the system control circuit 15 detects free areas of the optical disk 1 based on the acquired management data 16 and controls the optical pickup 3 accordingly in its access operation.

In recording the coded data and audio data output to the each area of the above-described about FIG. 2 through time-division multiplexing from the memory 9, the system control circuit 15 causes the optical pickup 3 to perform seek operations in a suitably timed relation with the time-division multiplexing. Concurrently, the system control circuit 15 changes the rotating speed of the spindle motor 5. These operations combine to write the coded data and audio data to their applicable areas on the disk.

With the video and audio signals written to the optical disk 1, the system control circuit 15 generates management data made up of addresses denoting locations to start and end the recording of the video and audio signals, and time codes representing points in time at which to start and end such recording. The management data thus generated are added to the management data 16 obtained from the optical disk 1. During the process, the system control circuit 15 generates the management data by supplementing them with image pickup condition data, audio data sampling rates, data for identifying compression and non-compression, and the format for the digital video signal SV.

The system control circuit 15 then causes the optical pickup 3 to seek the system data area ARS in a suitably timed manner so that the updated management data 16 will match the management data held in the system data area ARS on the optical disk 1. The operation updates the system data area ARS.

Where the video and audio signals are to be reproduced as designated by the operator, the system control circuit 15 causes the optical pickup 3 cyclically to perform seek operations in accordance with the management data 16 acquired from the optical disk 1, while controlling the reproduction section concurrently. This allows the video and audio signals desired by the operator to be reproduced.

If the operator sets editing points during the reproduction of the video and audio signals, the system control circuit 15 creates editing lists 30 as per the established editing points. The system control circuit 15 also accepts changes in the editing lists 30. When the operator takes action to effect a preview, the system control circuit 15 causes the optical pickup 3 to carry out seek operations in accordance with the editing lists 30 while controlling the reproduction section. Data are then reproduced from the optical disk 1 as per the editing lists 30, and the edited result is output.

Illustratively, it is assumed that the operator monitors successively materials A, B, C and D shown in FIG. 3A and representing the video signal on the optical disk 1. It is also assumed that the materials A, B and D are respectively assigned in-points IN1 through IN3 and out-points OUT1 through OUT3 in order to select cuts "a," "b" and "d" therefrom (see FIG. 3B). In such a case, the system control circuit 15 generates an editing list 30 designating successively the three cuts: cut "a" ranging from in-point IN1 to out-point OUT1 of the material A; cut "b" from in-point IN2 to out-point OUT2 of the material B; and cut "d" from in-point IN3 to out-point OUT3 of the material D. When a preview is specified, the system control circuit 15 controls the optical pickup 3 in its access operation to reproduce the cuts "a," "b" and "d" in that order (see FIG. 3C). The result of the editing of the cuts is output without modifying the materials A, B, C and D and without recording the edited result to the optical disk 1.

Suppose that given the edited result, the operator selects another cut "e" and designates the insertion of the cut "e" between the cuts "b" and "d." In that case, the system control circuit 15 changes arrangements in the editing list 30 accordingly and performs a preview in keeping with the modified editing list 30. This, too, allows the result of the insertion to be output without altering any material and without recording the edited result to the optical disk 1 (see FIGS. 3D and 3E).

Also suppose that given the edited result of the cuts "a," "b" and "d," the operator specifies more editing points to designate an overlay of a cut "e" (see FIGS. 3E and 3F). In such a case, the out-point of the cut "b" and the in-point of the cut "d" are modified so as to create new cuts "b'" and "d'" reflecting the additionally established editing points. The editing list 30 is altered correspondingly so that the cuts "a," "b'," "e" and "d'" will be reproduced in that order. A preview is then performed as per the altered editing list 30. In this case, too, the result of the overlay editing is output without changing any material and without recording the edited result to the optical disk 1.

On the other hand, suppose that in creating an editing list 30, the operator selects a transition mode involving special effects for merging two video signals recorded on the optical disk 1. In such a case, the system control circuit 15 performs an advance read of coded data for transition periods regarding one of the video signals, and places into the memory 22 the coded data thus read. The transition period is a period in which the edited result involves a transition from one video signal to another video signal, i.e., a period from the beginning to the end of special effects.

Illustratively, suppose that the operator monitors successively materials A, B, C and D shown in FIG. 4A and representing video signals recorded on the optical disk 1 to select cuts "a," "b" and "d" from the materials A, B and D so that these cuts may be merged by wipe (see FIG. 4B). In such a case, the coded data of the operator-designated transition periods T are reproduced from the optical disk 1 and stored into the memory 22 (see FIG. 4C). Here, the system control circuit 15 reproduces from the optical disk 1 the coded data regarding the video signal to be reproduced in advance, the coded data being placed into the memory 22. The system control circuit 15 accepts the settings of these transition periods either in terms of the start point (in-point) and the length of each transition period, or in terms of the length and the end point (out-point) of each transition period. With the settings accepted, the system control circuit 15 places the coded data into the memory 22 within a short time before the operator performs the next action.

While the coded data of the transition period regarding one of the two video signals to be merged are being held in the memory 22, the operator may designate a preview. In that case, the system control circuit 15 controls the optical pickup 3 and the reproduction section so that the coded data denoting the other video signal to be merged will be reproduced successively along with the video signal-representing coded data appearing before and after the coded data of the other video signal (see FIG. 4D). This causes video data DM2 to be reproduced from the optical disk 1 and sent to the effecter 8. The video data DM2 comprise the first cut "a" continuing up to a transition start point t1 followed by the second cut "b" continuing up to a transition start point t2, which in turn is followed consecutively by the third cut "d."

Under control of the memory control circuit 23, the system control circuit 15 supplies the data expansion circuit 24A with the coded data that were read beforehand and retained in the memory 22, in a suitably timed relation with the output of the video data DM2. In turn, the effecter 8 is fed with video data DM1 regarding the coded data held in the memory 22 starting from the transition start points t1 and t2.

The system control circuit 15 causes the effecter 8 to operate so that the video data DM2 from the data expansion circuit 24B will be output unmodified in periods other than a transition period T. In the transition period T, the video data DM1 and DM2 are assigned weights as per the weighting factors that are changed in keeping with the transition mode. Specifically, in the case of a wipe wherein image boundaries change in the horizontal direction so that the cut "a" is gradually replaced by the cut "b," the weighting factors of 0 and 1 set respectively for the video data DM1 and DM2 are switched to 1 and 0 at suitable points in time during the horizontal scan. The switching points are changed successively. This allows the system control circuit 15 to generate the video signal SV for the operator-designated preview without altering any material (see FIG. 4E).

If the operator changes any transition period or transition mode in the preview, the system control circuit 15 updates accordingly the coded data in the memory 22. If necessary, another preview is performed by use of the updated contents.

If the operator designates finalization of the transition periods and transition mode, the system control circuit 15 instructs the effecter 8 and other related circuits to merge the coded data of the two video signals, one being read out and held beforehand in the memory 22, the other being stored temporarily in the memory 22 upon reproduction at the time of the preview. The merging of the video data is performed for the transition periods T in the same manner as in the preview. The resulting video data from the effecter 8 are recorded by the recording section under control of the system control circuit 15. That is, the system control circuit 15 causes the data compression circuit 7 to compress the video data from the effecter 8 so as to generate the coded data. The coded data thus generated are recorded to the optical disk 1 in the same manner as in the recording of ordinary video signals. During the process, the system control circuit 15 controls the operation of the recording section so that only the video data corresponding to the transition periods T will be written to the optical disk 1 (see FIG. 4F).

In parallel with the above-described processing, the system control circuit 15 creates an editing list 30 describing the transition periods and transition mode finalized by the operator. The system control circuit 15 further describes, in the editing list, items designating cuts X1 and X2 of the transition periods recorded to the optical disk 1 in conjunction with the transition periods and transition mode. Such description is effected in an operator-transparent manner. In addition, the system control circuit 15 creates management data regarding the cuts X1 and X2 stating that the cuts X1 and X2 of the transition periods correspond to the editing list.

In the context of animation, for example, there are numerous instances in which the same cuts are merged for the same special effects. This illustratively involves the system control circuit 15 using repeatedly the same cuts (e.g., X1 and X2) in one editing situation after another in accordance with the cuts, transition mode and transition periods selected by the operator. In such a case, the cuts X1 and X2 previously recorded on the optical disk 1 are used repeatedly to execute a preview. An editing list 30 is created so as to use repeatedly the cuts X1 and X2 written on the optical disk 1 without creating newly cuts same as X1 and X2 to record them to the optical disk. In this manner, the system control circuit 15 utilizes effectively the data-recorded surface of the optical disk 1 to shorten editing time.

If the operator designates a preview upon completion of the settings involving the desired special effects, the system control circuit 15 reproduces data from the optical disk 1 in the same manner as the editing of cuts according to the editing list (see FIG. 4G). During the process, the cuts X1 and X2 are accessed in keeping with the description established in an operator-transparent fashion. Thus the system control circuit 15 records only the cuts associated with the transition periods to the optical disk 1 without altering any material, and outputs the edited result with special effects.

Suppose now that the operator selects fade-in, fade-out, or other special effects wherein levels of video signals are gradually changed so as to start or end a video signal image in accordance with a predetermined transition period and a predetermined mode. In that case, the system control circuit 15 reproduces consecutive cuts from the optical disk 1 in the same manner as in the editing of cuts. For example, in the case of fade-out, the brightness level of the video signal is raised gradually from the start point of the transition in keeping with the settings of the video process circuit 26, whereby the special effects desired by the operator are obtained.

After the preview, the operator may designate finalization of the transition periods and transition mode. In response, the system control circuit 15 creates an editing list 30 describing the transition periods and transition mode set by the operator. In the case of a review, video signals are reproduced from the optical disk 1 in accordance with the editing list 30. The reproduced video signals are processed by the video process circuit 26 before being output. In this manner, the system control circuit 15 outputs the result of the editing together with the special effects without modifying any material and without recording the edited result to the optical disk 1.

When the editing list 30 is finalized at the end of the above series of editing processes, the system control circuit 15 records the editing list 30 and the corresponding management data to the system data area ARS on the optical disk 1.

(1-2) Operation of the First Embodiment

The optical disk apparatus 2 of the above constitution (FIG. 1) works as follows: when the optical disk 1 is loaded into the apparatus, the optical pickup 3 first seeks the inner side of the disk. This allows the system control circuit 15 to acquire the management data 16 from the inner system data area ARS. From the management data 16 thus obtained, the system control circuit 15 detects writable areas on the optical disk 1.

In the optical disk apparatus 2, the video signal SV picked up illustratively by a camera unit is suitably processed by the video process circuit 6. The signal from the video process circuit 6 is subjected by the data compression circuit 7, located downstream, to a data compression process using MPEG techniques. Through its data compression process, the data compression circuit 7 converts the received signal into coded data DV that are accumulated successively in the memory 9. An audio signal corresponding to the video signal SV is converted to audio data that are also stored successively into the memory 9.

The coded data DV and audio data placed temporarily in the memory 9 are turned into blocks at predetermined time intervals as a unit of GOP and subjected to time-base compression. After the compression, the coded data DV and audio data are multiplexed on a time-division basis with time intervals interposed therebetween to allow for seek operations of the optical pickup 3. The time-division multiplexed data are output to the ECC encoder 13. The ECC encoder 13 adds error correction codes to the data in units of ECC data blocks. The error-corrected data are converted by the channel coding circuit 4 into a driving signal SR for driving the optical pickup 3. The driving signal SR causes the optical pickup 3 to raise the intensity of its laser beam intermittently from a reproducing level to a recording level. This causes the video signal SV and the corresponding audio signal to be recorded alternately to suitable areas on the optical disk 1 (see FIG. 2).

The optical pickup 3 performs seek operations from the outer to the inner areas of the optical disk 1 (see FIG. 1). Concurrently, the optical disk 1 is rotated at ZCLV in keeping with the seek operation of the optical pickup 3. These proceedings combine to cause the coded data DV and audio data to be recorded cyclically to the applicable areas.

When the recording of the coded data DV and audio data to the optical disk 1 is completed, the optical disk apparatus 2 causes the system control circuit 15 to generate management data 16. The management data thus generated are written to the system data area ARS on the optical disk 1. A history of and other data of the management data 16 about the materials recorded on the optical disk 1 are thus written to the same optical disk 1. This simplifies the procedure of managing the recorded materials.

Upon completion of the writing of the materials to the optical disk 1, the optical disk 1 is edited by the optical disk apparatus 2 (see FIGS. 3A to 3F). The result of the editing is output as needed.

When the optical disk 1 is loaded into the optical disk apparatus 2 (FIGS. 3A to 3F), the optical pickup 3 first seeks the inner side of the disk. The system control circuit 15 obtains the management data 16 from the system data area ARS on the inner side. From the management data 16, the system control circuit 15 acquires location and history information about the code data DV and audio data recorded on the optical disk 1.

Given the history information, the operator may designate reproduction of specific video and audio signals. In response, the optical disk apparatus 2 causes the optical pickup 3 to seek the corresponding areas while rotating the optical disk 1 rapidly at a constant angular velocity. The operation plays back a reproduced signal RF from the areas designated by the operator at a transfer speed higher than that of recording. The reproduced signal RF is converted to reproduced data from which coded data and audio data are decoded and placed into the memory 22.

When a predetermined quantity of coded data or audio data has been accumulated in the memory 22, the optical pickup 3 starts seeking the optical disk 1 to reproduce therefrom the audio data or coded data corresponding to the data stored in the memory 22. The data thus reproduced are also placed into the memory 22.

The reproduction of coded data and that of audio data are reciprocated. In the optical disk apparatus 2, the coded data and audio data selected by the operator are reproduced intermittently and at the high transfer speed from the optical disk 1. The reproduced data are accumulated in the memory 22.

In parallel with the accumulation of the coded data and audio data, the optical disk apparatus 2 outputs the coded data from the memory 22 to the data expansion circuit 24A in a continuous data train. The data expansion circuit 24A expands the received data and outputs the resulting data through the effecter 8 and video process circuit 26. Concurrently with the video signal processing, the video data are output consecutively from the memory 22 for output onto a suitable monitor.

In turn, the operator may set editing points successively in the reproduced video signal SV and audio signal. The system control circuit 15 creates an editing list 30 comprising the editing points thus established.

Suppose that the transition mode designated by the operator in the editing process is one of editing cuts (see FIGS. 3A to 3F), and that the operator selects the cuts "a," "b" and "d" from the materials A, B, C and D by establishing the in-points IN1, IN2 and IN3 and the out-points OUT1, OUT2 and OUT3. In that case, the editing list 30 is prepared to include consecutively the in-points IN1, IN2 and IN3 and the out-points OUT1, OUT2 and OUT3 so that the selected cuts "a," "b" and "d" will be reproduced in that order.

If the operator specifies a preview, the system control circuit 15 causes the optical pickup 3 to execute access in a sequence pursuant to the editing list 30. The optical pickup 3 acquires the reproduced signal RF at the high transfer speed, and the reproduced signal RF is processed in the same manner as in ordinary reproduction. The process provides an output of the result of the preview. Given the preview result, the operator is allowed to alter editing points or make other modifications before finalizing the editing list 30. Thereafter, the system control circuit 15 records the finalized editing list 30 to the system data area ARS on the optical disk 1.

As described, the result of the editing of cuts is output without modifying any of the materials A, B, C and D recorded on the optical disk 1. The valuable materials, left intact, may be utilized subsequently for other purposes as needed. Simply creating an editing list allows the result of desired editing to be output; there is no need to record the edited result to the optical disk 1. The proceedings make editing work simpler and less time-consuming than before.

Changes of the editing points may illustratively involve insertion and overlay. That is, an additional cut "e" may be inserted between the cuts "b" and "d," and a desired cut "e" may be overlaid onto the cuts "a" through "d" thus edited. In such cases, simply changing the editing list allows the newly edited result to be output without altering any materials and without writing the edited result to the optical disk 1 (see FIGS. 3D to 3F). Editing work in any case is simplified and takes only a short time to complete, with all valuable materials left intact.

If the operator selects a transition mode involving special effects for merging two video signals, the optical disk apparatus 2 causes the optical pickup 3 to read one of the two video signals in advance in conjunction with the transition periods T. The video signal thus read is stored into the memory 22.

Suppose now that the operator selects the cuts "a," "b" and "d" from the materials A, B, C and D by setting suitable in- and out-points successively and designates connection of these cuts for a wipe (FIGS. 4A and 4B). In that case, the system control circuit 15 acquires the in-and out-points of the cuts "a," "b" "d" as well as the transition periods T and transition start positions at connections between the cuts "a," "b" and "d." After the operator has entered such information and before a preview is specified, the optical pickup 3 is controlled to reproduce the coded data of one video signal for the transition periods T. The coded data thus reproduced from the optical disk 1 are placed into the memory 22 (see FIG. 4C).

When the operator designates a preview, the optical disk apparatus 2 reproduces the coded data before and after the transition periods T as well as the coded data associated with the transition periods T on a time series basis as designated by the operator. The reproduced data are output through the data expansion circuit 24B and effecter 8 (see FIG. 4D).

At transition start points t1 and t2, the optical disk apparatus 2 moves the coded data representing one video signal from the memory 22 to the effecter 8 via the data expansion circuit 24A. The effecter 8 merges the received data with the coded data representing the other video signal. In this manner, the video process circuit 26 outputs a video signal SV furnished with special effects constituting illustratively a wipe (see FIG. 4E).

In that case, too, a preview is made of the result of editing with special effects for merging the two video signals without any modification of the materials and without recording of the edited result to the optical disk 1. What is known as a multi-effect preview may also be carried out within the capacity of the memory 22.

If changes are made in the transition periods or transition mode as a result of the preview, the optical disk apparatus 2 reads in advance the coded data representing one video signal in accordance with these changes. The retrieved data are accumulated into the memory 22. Another preview is then carried out using the accumulated data.

When the transition mode and transition periods have been finalized, the effecter 8 merges for the transition periods T the coded data which represent one video signal and which are held beforehand in the memory 22, with the code data which represent the other video signal and which are stored temporarily in the memory 22 upon reproduction for the preview, to generate combined video data. The combined video data are converted by the data compression circuit 7 into coded data DV. In the same manner as in the previous recording, the code data DV are written to the optical disk 1. This is how the cuts X1 and X2 of the transition periods T are recorded onto the optical disk 1 (see FIG. 4F).

In the case above, it is possible to obtain the result of the two video signals being merged and edited for special effects, by simply writing the edited result of the very short transition periods T to the optical disk 1. No changes are made in the materials during the editing.

Concurrently with the above series of processes, the optical disk apparatus 2 causes the system control circuit 15 to generate an editing list 30 in the same manner as in conventional editing work, the list describing the transition periods and transition mode established by the operator. Also described in the editing list 30 are items designating the cuts X1 and X2 for the transition periods recorded on the optical disk 1 in conjunction with the transition periods and transition mode associated with the desired special effects. Such description is usually set in an operator-transparent fashion. Also created are management data about the cuts X1 and X2 stating that these cuts of the transition periods correspond to the editing list. The editing list and the management data are then written to the optical disk 1.

With the editing list and management data thus recorded, the optical disk 1 allows the edited contents to be verified in the same manner as in conventional editing work utilizing editing lists. It is also possible to reproduce the edited result with special effects in the same manner as in the simple editing of cuts (see FIG. 4G).

In animation or like fields where the same cuts may be merged for the same special effects, the same cuts X1 and X2 recorded on the optical disk 1 may also be utilized in other editing work and the result may be previewed. An editing list 30 may be created so as to use repeatedly the cuts X1 and X2 recorded previously on the optical disk 1. In this manner, the data-recorded surface of the optical disk 1 may be employed effectively in order to shorten editing time.

If the operator selects fade-in, fade-out, or other special effects wherein levels of video signals are gradually changed so as to start or end a video signal image in accordance with a predetermined transition period and a predetermined mode, the optical disk apparatus 2 reproduces consecutive cuts from the optical disk 1 in the same manner as in the editing of cuts. The special effects desired by the operator are then obtained in keeping with the settings of the video process circuit 26.

When the operator designates finalization of the transition periods and transition mode, the system control circuit 15 creates the editing list 30 describing the transition periods and transition mode set by the operator. This editing list 30 is written to the optical disk 1.

As described, the optical disk apparatus 2 permits desired results of editing to be obtained with no modification of the materials and without the recording of any edited result to the optical disk 1. As such, the optical disk apparatus 2 constitutes a simply structured, easy-to-operate editing system.

(1-3) Effects of the First Embodiment

When merging two video signals for special effects, the first embodiment of the above structure writes to the optical disk 1 a combined video signal derived from the two signals and associated only with transition periods. By simply recording the combined video signal to the optical disk 1, the embodiment offers the desired result of editing without modification of any material. The setup is simple in structure and permits easy editing work. The materials may be reedited at a later date for more convenience. The same effects or the same scene may be repeated by recurring use of cuts based on the combined video signal recorded on the optical disk 1. That procedure saves editing time and makes effective use of the data-recorded surface on the optical disk 1.

With the optical disk 1 rotated at a high rotating speed, coded data are obtained from the disk and stored temporarily in the memory 22. The data are output from the memory 22 in a continuous video signal train. Taking advantage of this capability, the first embodiment reads in advance the coded data representing one of two video signals to be merged and stores the read data temporarily in the memory. Concurrently, the first embodiment reproduces from the optical disk 1 the coded data representing the other video signal, converts the reproduced data to video data, and merges the two sets of data. The result of editing is thus previewed in a short time with the simply structured arrangement. The combined video signal may be recorded to the optical disk 1. Depending on the capacity of the memory 22, the so-called multi-effect preview may also be made available.

An editing list 30 may be prepared in a way that the video signals to be merged and the combined video signal will be reproduced successively according to the list. When the editing list 30 is written to the optical disk 1, the optical disk 1 may be accessed and reviewed in the same manner as in the simple editing of cuts. There is no need to record all edited result to the optical disk 1; the result may still be verified by the simply structured optical disk apparatus.

Where levels of video signals are gradually changed for special effects starting or ending a video signal image in accordance with a predetermined transition period and a predetermined mode, the process is executed under control of the video process circuit 26 as per the editing list. In this case, too, the desired result of editing is acquired by the simply structured easy-to-edit apparatus that simply records the combined video signal to the optical disk 1 with no modification affecting the materials.

(2) Other Embodiments

In the first embodiment described above, where levels of video signals are gradually changed for special effects starting or ending a video signal image in accordance with a predetermined transition period and a predetermined mode, the process has been shown to be executed under control of the video process circuit 26 as per the editing list. However, this is not limitative of the invention. Alternatively, the result of the editing associated with the transition period may be recorded to the optical disk 1 in the same fashion as in the merging of two video signals, and the result may be reproduced in the same manner as in the editing of cuts. These measures allow an optical disk apparatus having no video process circuit of the above type simply to provide a review.

With the first embodiment, the previously read coded data have been shown to be stored temporarily in the memory 22 so as to implement momentary storage of one of two video signals to be merged. However, this is not limitative of the invention. Alternatively, one of the two video signals to be merged may be stored temporarily by setting up another memory 22 or by relocating the existing memory 22, the memory serving to accommodate temporarily the reproduced data from the channel decoding circuit 20 and the output data from the data expansion circuit.

Although the first embodiment has been shown having one of two target video signals stored temporarily before the signal is merged with the other video signal, this is not limitative of the invention. Alternatively, in a system having two optical pickups, the video signals to be merged may be reproduced individually by the two pickups.

Whereas the first embodiment has been shown having editing lists written to the optical disk 1, this is not limitative of the invention. Alternatively, editing lists may be supplied on a floppy disk to the optical disk apparatus or may be transmitted online to the apparatus over a transmission line.

Although the first embodiment has been shown having the data-recorded surface of the optical disk divided concentrically into smaller areas in which to record video and audio signals successively, this is not limitative of the invention. Alternatively, the coded data and audio data multiplexed on a time-division basis in units of error correction blocks or data compression blocks may be recorded to the optical disk by use of the time-division multiplexed data stream.

Although the first embodiment has been shown having one optical pickup writing and reading data to and from the optical disk, this is not limitative of the invention. A plurality of optical pickups may be used instead to record and reproduce audio and video signals to and from the disk.

The first embodiment is characterized in that video and audio signals are recorded in a successively cyclical manner from the outer to the inner side on the disk surface. However, this is not limitative of the invention. If a sufficiently high data transfer speed is ensured, the signals may start getting recorded from the inner to the outer side, the inner side suffering from less wobbly movement and thereby permitting more stable reproduction of data. If address management permits, the signals may be recorded with predetermined areas interposed therebetween.

The first embodiment has been shown having management data recorded on the innermost area of the optical disk. Alternatively, the management data may be written in any appropriate areas as needed. Likewise the editing list may be recorded where desired on the disk.

Although the first embodiment has been shown having the optical disk rotated at ZCLV to record digital video signals and other data thereto and having the disk rotated at a constant angular velocity to reproduce data therefrom, this is not limitative of the invention. Alternatively, if a magneto-optical disk having a sufficiently high storage capacity is employed as a disk storage medium, the optical disk may be rotated at a constant angular velocity for both recording and reproduction. Where a phase change type optical disk is utilized, it may be possible to adjust the intensity of a laser beam to record desired data reliably to the disk differing in linear velocity between the inner and the peripheral side. In such a case, the optical disk may be driven at a constant angular velocity for both recording and reproduction.

Whereas the first embodiment has been shown having digital video signals compressed by MPEG techniques before the compressed signal are recorded onto the optical disk, this is not limitative of the invention. The invention may also be applied to a wide range of setups wherein data are compressed by other suitable techniques.

The first embodiment has been shown having digital video and audio signals written to a dual-side writable photo-crystallization type optical disk. Alternatively, the invention may be implemented in conjunction with a dual-side writable magneto-optical disk or a write-once type optical disk. If a sufficient storage capacity is made available, one side alone of the disk may be used.

As described and according to the invention, where two video signals are merged for special effects of transition from one video signal to the other video signal in accordance with predetermined transition periods and a predetermined transition mode, a video signal combining the two signals for the transition periods alone is recorded to the optical disk. With only the combined video signal recorded to the optical disk, the inventive apparatus offers desired results of editing while leaving the original materials intact. The invention when thus implemented constitutes a simply structured, time-saving editing system.

As many apparently different embodiments of this invention may be made without departing from the spirit and scope thereof, it is to be understood that the invention is not limited to the specific embodiments thereof except as defined in the appended claims.

What is claimed is:

1. An editing apparatus for merging first and second video signals recorded on a disk, said editing apparatus comprising:

video signal reproducing means for reproducing said first video signal and said second video signal from the very same disk;

video signal merging means for merging said first and second video signals over a transition period to generate a merged video signal exhibiting a transition from said first video signal to said second video signal over said transition period and in accordance with a predetermined transition mode; and video signal recording means for recording to the very same disk only said transition period of said merged video signal, such that said transition period is recorded in an area separate and apart from said first video signal or said second video signal.

2. An editing apparatus according to claim 1, further including a memory and a memory controller, and wherein, prior to merging said first and second video signals, said video signal reproducing means reads said first video signal from said disk and temporarily stores the read first video signal in said memory, and wherein the memory controller outputs the temporarily stored first video signal to said video signal merging means together with said second video signal reproduced from said disk.

3. An editing apparatus according to claim 1, further comprising:

signal level adjusting means for adjusting levels of said first and second video signals output by said video signal reproducing means by gradually changing the levels of the output video signals so that images of the output video signals start and end with said adjusted levels over said transition period in accordance with said predetermined transition mode; and means for generating control information representing said adjusted levels.

4. An editing apparatus according to claim 1, further including means for producing an edit list identifying the sequence in which said first video signal, said merged video signal and said second video signal are to be reproduced to form an edited video signal, and means for recording said edit list to a predetermined region on said disk.

5. An editing apparatus according to claim 4, further comprising:

signal level adjusting means for adjusting levels of said first and second video signals output by said video signal reproducing means by gradually changing the levels of the output video signals so that images of the output video signals start and end with said adjusted levels over said transition period in accordance with said predetermined transition mode; and means for generating control information representing said adjusted levels, said control information being included in said edit list.

6. An editing method for merging first and second video signals, comprising the steps of:

reproducing said first video signal and said second video signal from a common disk;

merging said first and second video signals over a transition period to generate a merged video signal exhibiting a transition from said first video signal to second video signal over said transition period and in accordance with a predetermined transition mode; and recording to said common disk only said transition period of said merged video signal, such that said transition period is recorded in an area separate and apart from said first video signal or said second video signal.

7. An editing method according to claim 6, further comprising the steps of:

reading said first video signal from said disk prior to the merging of said first and second video signals;

temporarily storing the read first video signal; and merging the temporarily stored first video signal with said second video signal reproduced from said disk so as to generate said merged video signal.

8. An editing method according to claim 6, further comprising the steps of:

adjusting levels of said first and second video signals reproduced from said disk by gradually changing the levels of the reproduced video signals so that images of the reproduced video signals start and end with said adjusted levels over said transition period in accordance with said predetermined transition mode; and generating control information representing said adjusted levels for editing said video signals.

9. An editing method according to claim 6, further comprising the step of recording to a predetermined region on said disk an editing list identifying the sequence in which said first video signal, said merged video signal and said second video signal are to be reproduced to form an edited video signal.

10. An editing method according to claim 9, further comprising the steps of:

adjusting levels of said first and second video signals reproduced from said disk by gradually changing the levels of the reproduced video signals so that images of the reproduced video signals start and end with said adjusted levels over said transition period in accordance with said predetermined transition mode; and generating control information representing said adjusted levels, said control information being included in said editing list.

* * * * *